United States Patent
McGregor (10) Patent No.: US 7,378,585 B2
(45) Date of Patent: May 27, 2008

(54) MUSICAL TEACHING DEVICE AND METHOD USING GLOVES AND A VIRTUAL KEYBOARD

(76) Inventor: Rob McGregor, 6342 Forest Hill Blvd., West Palm Beach, FL (US) 33415

( * ) Notice: Subject to any disclaimer, the term of this patent is extended or adjusted under 35 U.S.C. 154(b) by 243 days.

(21) Appl. No.: 11/288,836

(22) Filed: Nov. 28, 2005

(65) Prior Publication Data
US 2006/0137511 A1   Jun. 29, 2006

Related U.S. Application Data

(63) Continuation-in-part of application No. 10/457,147, filed on Jun. 6, 2003, now Pat. No. 6,982,375.

(51) Int. Cl.
*G10H 1/00* (2006.01)
(52) U.S. Cl. .................. 84/600; 84/470 R; 345/156
(58) Field of Classification Search .................. 84/600, 84/470 R; 345/156
See application file for complete search history.

(56) References Cited

U.S. PATENT DOCUMENTS

| | | | |
|---|---|---|---|
| 4,204,455 A | 5/1980 | Harrington | |
| 4,635,516 A | 1/1987 | Giannini | |
| 4,769,881 A | 9/1988 | Pedigo et al. | |
| 4,920,848 A | 5/1990 | Suzuki | |
| 5,046,394 A | 9/1991 | Suzuki et al. | |
| 5,082,258 A | 1/1992 | Niks | |
| 5,151,553 A | 9/1992 | Suzuki et al. | |
| 5,184,319 A | 2/1993 | Kramer | |
| 5,392,682 A | 2/1995 | McCartney-Hoy | |
| 5,581,484 A * | 12/1996 | Prince | 702/150 |
| 5,631,861 A | 5/1997 | Kramer | |
| 5,638,831 A | 6/1997 | Brown | |
| 5,990,405 A * | 11/1999 | Auten et al. | 84/609 |
| 6,032,530 A | 3/2000 | Hock | |
| 6,042,555 A | 3/2000 | Kramer et al. | |
| 6,059,506 A | 5/2000 | Kramer | |
| 6,162,981 A | 12/2000 | Newcomer et al. | |
| 6,262,355 B1 | 7/2001 | Koch | |
| 6,827,579 B2 | 12/2004 | Burdea et al. | |
| 2002/0130844 A1* | 9/2002 | Natoli | 345/168 |
| 2007/0201932 A1* | 8/2007 | Rong | 400/489 |

FOREIGN PATENT DOCUMENTS

JP          200089754 A    3/2000

* cited by examiner

*Primary Examiner*—Jeffrey Donels
(74) *Attorney, Agent, or Firm*—McHale & Slavin, P.A.

(57) ABSTRACT

A portable musical teaching interface system for purposes of providing the user with the skills necessary to play the piano. The interface system comprising a pair of gloves each having a plurality of finger sleeves adapted to receive the fingers of a user's hands, a display means for providing a virtual representation of the user's hands in relation to said virtual keyboard and a control means in communication with the finger sleeves to provide control signals that cause the finger sleeves to strike the proper keys on the virtual piano to a programmed sequence of movements which corresponds to a selected piece of music.

10 Claims, 7 Drawing Sheets

MUSICAL TEACHING DEVICE AND METHOD USING GLOVES AND A VIRTUAL KEYBOARD

CROSS REFERENCE TO RELATED APPLICATION

This application is a continuation-in-part of application Ser. No. 10/457,147, filed Jun. 6, 2003, now U. S. Pat. No. 6,982,375 the contents of which are herein incorporated by reference.

FIELD OF THE INVENTION

This invention relates to teaching a subject to play a computer-generated or "virtual" musical instrument; particularly, to a musical instrument accessory to stimulate the fingers of a user in a musically programmed sequence of movements on the virtual instrument.

BACKGROUND OF THE INVENTION

Historians recognize Bartolommeo Cristofori as having invented the piano during the early 1700's. However, use of a finger keyboard which functions to create sounds, dates back to approximately the year 1350 when such a keyboard was added to an instrument called the psaltery. The instrument resulting from the addition of the keyboard to the psaltery became known as the harpsichord. The keyboard used throughout history has remained virtually unchanged to modern times. Today, modern pianos, harpsichords, and even technology's most cutting edge electronic instruments employ virtually the same keyboard that was developed in the 1300's.

The playing of music on a keyboard instrument by a subject human being requires the subject to perform numerous simultaneous motor-skills and thought processes, not the least of which is the proper striking of the various keys at the proper time(s), in the proper sequence and rhythms. Additionally, the timing, speed, pressure and velocity by which certain keys are struck are also an integral component in the process. The process of playing a keyboard instrument also requires the ability to read the printed musical 'grand-staff,' recognizing which notes on the staffs correspond with the proper keys on the keyboard and the order by which each key is struck, and which fingers should be used to strike each key. All of these components are a learned skill which, historically, has required that the subject learn each facet separately, until eventually, the subject is able to put each skill together in concert, through repetitive practicing, hopefully resulting in the subject playing the keyboard and creating music.

The learning process could be greatly abbreviated if the subject had use of an apparatus by which the motor-skill component of the learning process could be assisted by means of the apparatus mechanically 'teaching' each of the subject's individual fingers which keys to strike, in the proper sequence and timing by the apparatus manipulating the subject's fingers directly on the keyboard. Furthermore, the ability to automatically associate the notes on the printed staff with the corresponding keys on the keyboard in concert with the mechanical manipulating of the subject's fingers would also abbreviate the learning time of that component of the learning process.

The term "virtual reality" (VR) was coined by Jaron Lanier in 1989 to describe the artificial environment created by a computer. Most virtual reality environments are primarily visual experiences, but some simulations include additional sensory information, such as, sound through a sound circuit. Virtual reality is considered an immersive system when cybergoggles (also called headgear) are used to create the virtual ambient. Non-immersive virtual reality uses a computer monitor to display 3-dimensional, high-resolution images.

What the prior art has thus far failed to provide is a portable, yet realistic, man-machine interface that will visually show a virtual keyboard and a virtual depiction of the proper position of the user's hands as it relates to printed music on the grand staff, and which will electrically stimulate the user's hands and fingers to indicate and aid the proper finger movement necessary to strike the proper keys, at the exact proper times, in the proper sequence and rhythm, and using the proper velocity, speed and timing to produce music denoted by printed music or other music source.

DESCRIPTION OF THE PRIOR ART

Currently there are numerous electrical devices used for training a subject to move in a certain way, particularly, in rehabilitation therapy to assist in redeveloping lost nerve and muscle damage. For example, U.S. Pat. No. 6,042,555 to Kramer et al., teaches a device that applies force to an appendage for exercise and detects movement and measures the force being generated by the patient.

In addition, there are nerve stimulation devices that apply a non-injurious electrical pulse to the patient, such as disclosed in U.S. Pat. No. 4,769,881 to Pedigo et al.

Some computer simulations use gloves for the user-machine interface and detect finger movement and force. One such device is disclosed in U.S. Pat. No. 6,262,355 to Koch.

Other electrical devices are worn on the hands and give a tone or note in response to finger movement, such as U.S. Pat. No. 4,920,848 to Suzuki and U.S. Pat. No. 4,635,516 to Giannini.

Newcomer et al., U.S. Pat. No. 6,162,981, disclose a finger placement sensor for stringed instruments for instructional purposes. The fingerboard is electrically wired throughout its length to indicate when a string is in contact with the board. A computer program is programmed to show where on the fingerboard a string must be in contact to produce certain musical notes by projecting different colors over the fingerboard. Unlike the instant device, there is no stimulation of the player's hand based on controller indications.

Niks, U.S. Pat. No. 5,082,258, is an exercise device for pianists having an elongated carriage that requires the player to position the hands, wrists, and forearms in the correct position to depress a series of balls suspended over a keyboard. Unlike the instant invention, the reference is directed only to teaching proper posture or attitude of the hands and arms, not how to play a musical score. Furthermore, this reference fails to suggest a controller that sends signals to stimulate the player's fingers to strike a key to play a segment of a musical score.

McCartney-Hoy, U.S. Pat. No. 5,392,682, discloses a keyboard and optical rod containing a plurality of light-emitters or tone/vibration emitters, the rod being electrically connected to an electric processor or computer. Each key on the keyboard is to be struck as indicated, in proper sequence, by illumination of the light-emitter corresponding to that particular key. Simultaneously, the appropriate hand and finger to be used when striking each key displayed visually by the processor. Again, there is no connection between the computer or program and the user's hand or fingers.

Burdea et al., U.S. Pat. No. 6,827,579, disclose a PC-based virtual reality system that works alone to provide stroke patients an effective, intensive non-tedious hand-impairment therapy. The system uses two types of sensor-equipped gloves along with programs running on a PC to provide both therapy and a way for the therapist to chart their progress. In use, the patient's gloved hands are linked to virtual hands on the PC monitor. By interacting with and playing with various onscreen graphics-including butterflies, piano keyboards and mechanical hands—the user performs intensive rehab exercises without drudgery. Unlike the instant invention, the users fingers are not flexed upon delivery of non-injurious electrical pulses to sleeves on the user's finger so as to engage the proper key on the virtual keyboard, such forced flexion of a patient undergoing rehabilitation could be cause damage.

Fujiwara et al., JP200089754A, disclose a glove having finger sleeves connected to a control system. The control system includes memory that stores finger moving indication data the control system uses to supply electric power to stimulation providing elements of selected fingers. The reference fails to disclose providing a visual representation on a monitor illustrating the proper positioning of the virtual hands on said virtual keyboard necessary to play said musical score.

None of the aforementioned references, nor the combination thereof, teach or suggest an instruction interface for use with a virtual keyboard comprising a controller that causes a player's fingers to strike the appropriate keys on the virtual keyboard based on a program containing commands that correspond to a musical score, and a display that provides a visual representation of the proper positioning of the player's hands on the keyboard necessary to play the musical score.

SUMMARY OF THE INVENTION

The approach of the instant invention is to train the hands to play songs of all levels, beginner to the most advanced. Difficult classical piano arrangements that would take 10 years to play properly can be reduced to a matter of months. The subject can be playing advanced popular songs in a matter of weeks. Under traditional teaching methods, it would take years to develop the muscle memory and the ability to coordinate mentally and physically a number of different things. The list of different things would include: learning to read sheet music, which in itself is an extensive process; hand positioning; and fingering. To read all of this information on a piece of sheet music quickly enough, position the hands in the correct area of the keys, use specific fingering, all coordinated and timed together is a task that takes years of practice. This would normally be achieved by countless hours of verbal instruction and practicing piano scales.

Accordingly, it is an objective of this invention to teach a system that gets immediate results because the interface actually lightly pulls each finger down to play individual keys and chords, thus, the fingers to gain the muscle memory and timing needed to play a piece of music. The lessons learned from the instant teaching interface will allow the user to play on a physical piano and/or keyboard.

Yet another objective of the instant invention is to provide a teaching interface used to practice a music score, thereby eliminating the need for a real piano or keyboard, which are often expensive and/or not readily portable.

Still another objective of the instant invention is to provide a teaching interface that will make instruction more entertaining and not a chore; hence, the user is more likely to practice.

Another objective of this invention is to visually teach certain numbered hand positions on computerized sheet music to learn how open or closed to hold the hand and show the hand positions.

Yet another objective of the instant invention is to provide a portable, virtual piano keyboard compatible with nearly any computer.

A further objective of this invention is to teach a user playing an instrument to devote their attention to the sheet music and as a result learn to read sheet music faster by the association with what they are feeling from the interface.

Another objective of this invention is to teach the use of an interface in the form of gloves or finger sleeves connected to a controller to provide stimulation to each finger to indicate proper movement in synchrony with sheet music visually presented on the display means.

DETAILED DESCRIPTION

Detailed embodiments of the instant invention are disclosed herein, however, it is to be understood that the disclosed embodiments are merely exemplary of the invention, which may be embodied in various forms. Therefore, specific functional and structural details disclosed herein are not to be interpreted as limiting, but merely as a basis for the claims and as a representative basis for teaching one skilled in the art to various employ the present invention in virtually any appropriately detailed structure.

In a non-immersive embodiment of a piano teaching interface as contemplated by the instant invention, the teaching interface system 20 comprises a controller 22 (FIG. 4), preferably, a portable computer (e.g., laptop, notebook, etc.) in communication with a display means 24 such as, albeit not limited to, a computer monitor.

Figure 1:
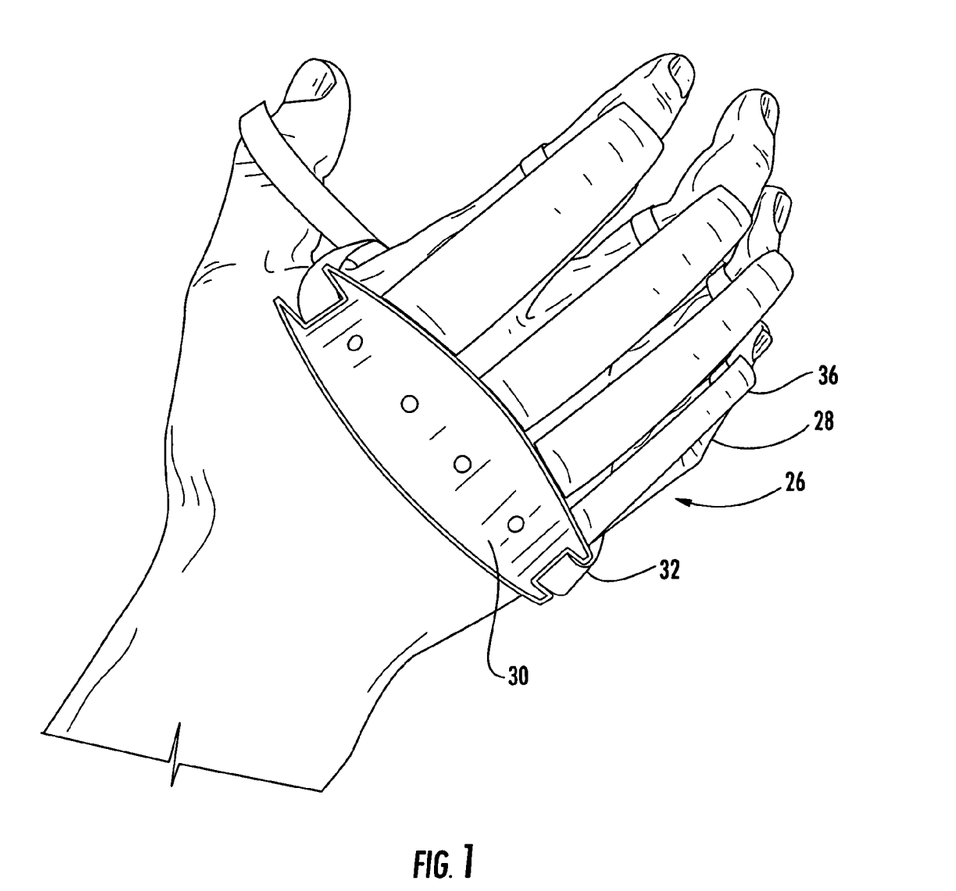
FIG. 1 is an upper perspective view of a glove having a plurality of finger sleeves positioned over each gloved finger.
Figure 2:
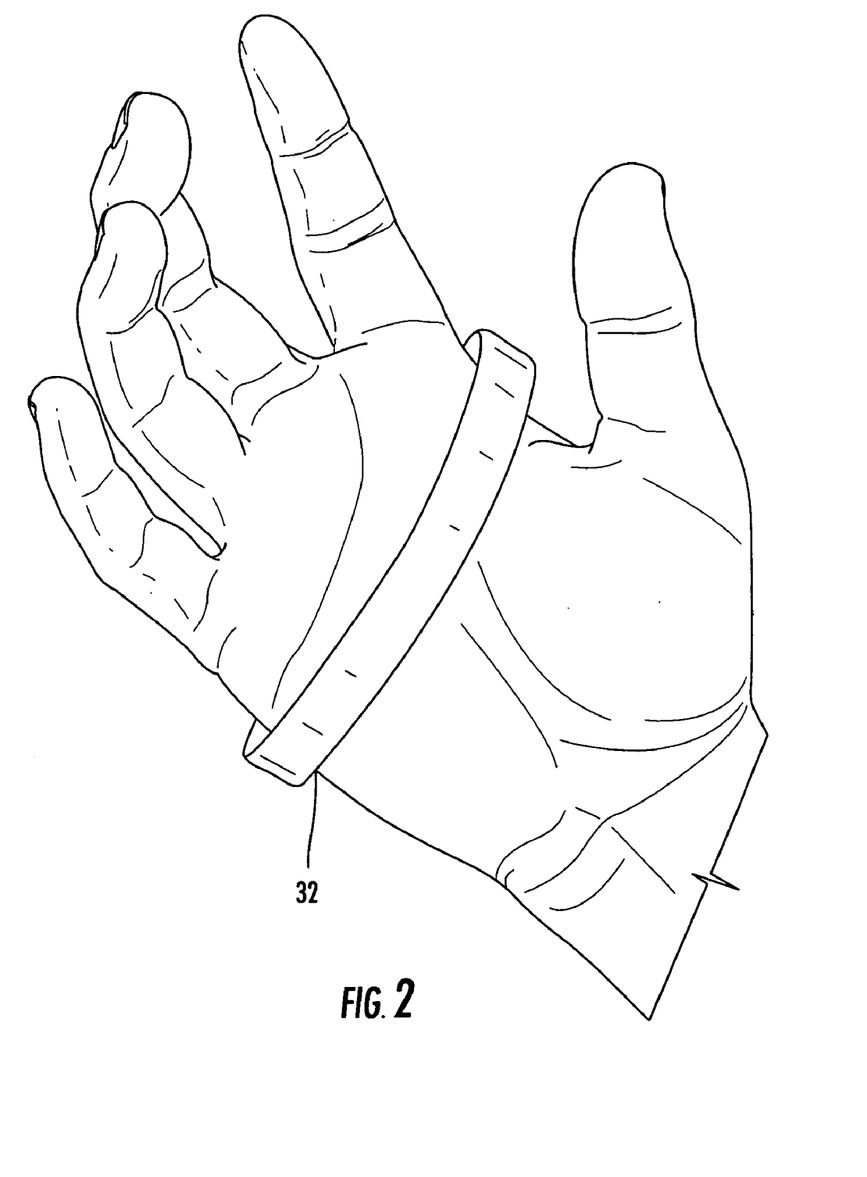
FIG. 2 is a bottom perspective view of the embodiment of FIG. 1.

The teaching interface further includes a pair of identical gloves 26 (only the right glove shown in FIGS. 1, 2, and 4) both adapted to receive most player's hands. FIG. 1 shows an upper perspective view of the glove 26 having a plurality of finger sleeves 28 positioned over the top of each gloved finger and adapted to surround and attach to the same. The finger sleeves include a signal-receiving portion 30 constructed and arranged to receive control signals from the controller (is this correct?). These control signals may be provided in the form of electrical, optical, or the like, without departing from the scope of the invention.

Figure 3:
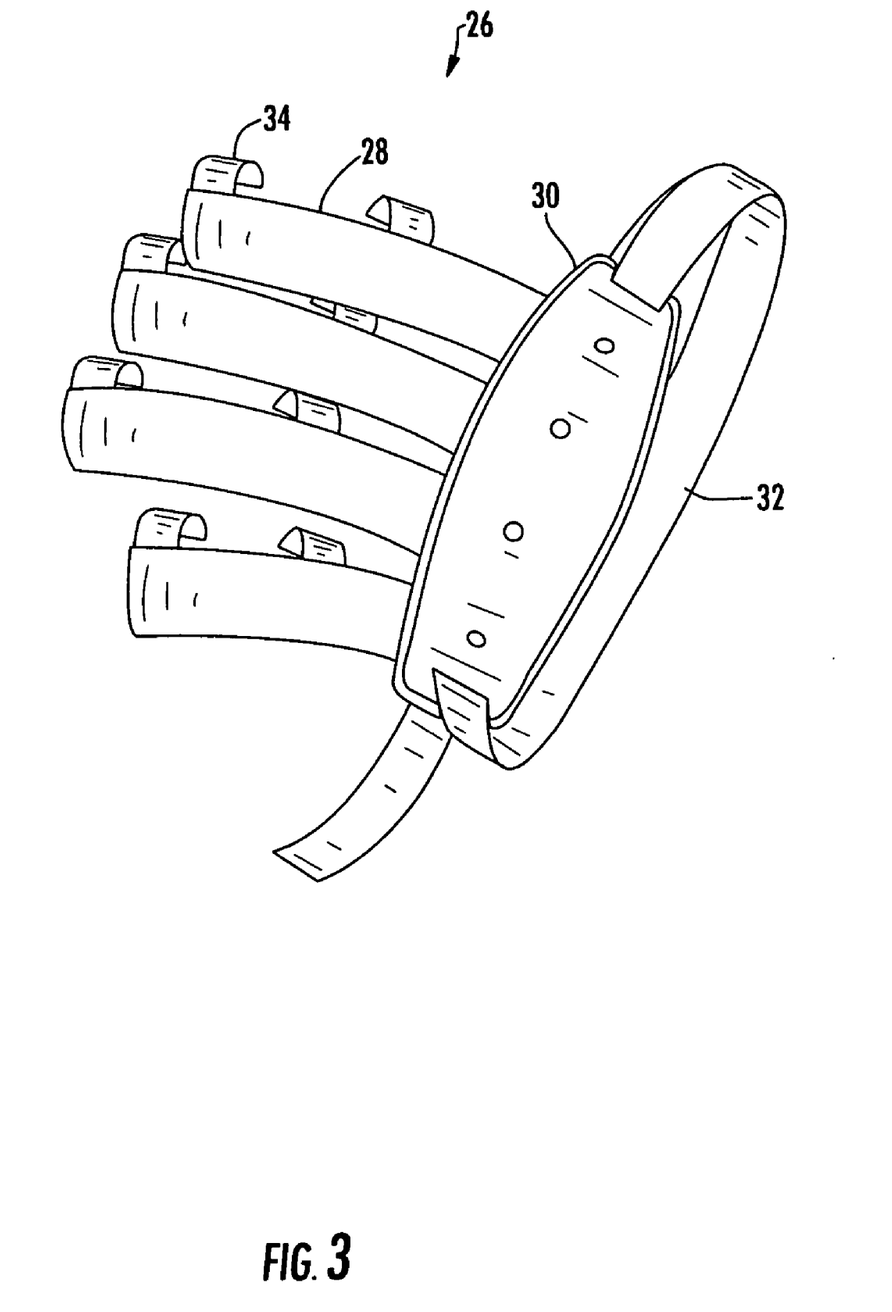
FIG. 3 is a bottom perspective view of the finger sleeves 26 without the glove shown in FIG. 1.

In the embodiment shown in FIG. 1, the finger sleeves are constructed and arranged to slip over the fingers of the glove and held comfortably against the upper portion of the hand and along the shaft of the fingers by any means of attachment known in the art. For example, the finger sleeves are held in place along the gloved fingers by hook and loop type (VELCO) finger fastening straps 34 and against the gloved hand with adjustable strap 32 threaded through integrated apertures located at opposite sides of the signal-receiving portion 30, as shown in the bottom perspective view in FIG. 2. Alternatively, the finger sleeves may be permanently attached to a glove by any means of attachment known to the skilled artisan, such as sewing, adhesives, welding or the like. FIG. 3 offers a bottom perspective view of the finger sleeves 26 without the glove.

Figure 6:
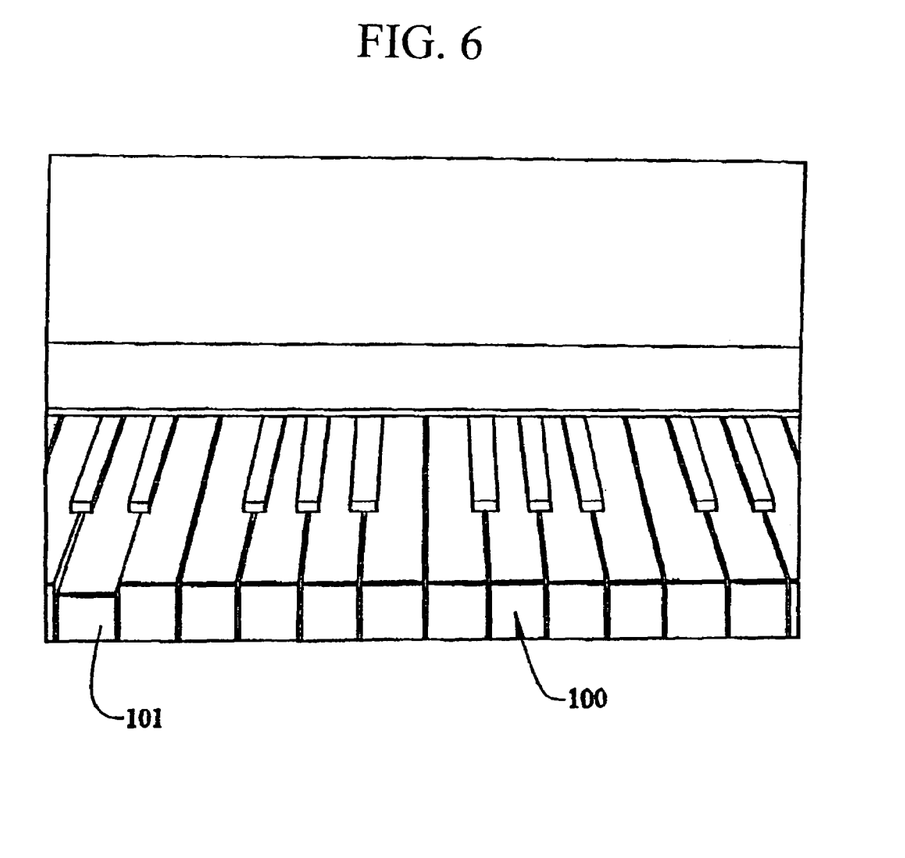
FIG. 6 is a representation of the keyboard image.

The controller 22 is in communication with the finger sleeves and provides control signals from a program containing a sequence of finger movement commands that correspond to a music score. The control signals cause the appropriate finger sleeve to actuate. The display means shows the actuation of the appropriate key 101 on a virtual piano keyboard 100 that corresponds to a note of the musical score, as shown in FIG. 6. Preferably, each finger of the finger sleeves has a fine electrically conductive line 36 fixed thereto, which delivers non-injurious electrical pulses to the respective finger sleeve causing it to bend as instructed by the controller 22.

In another embodiment not shown the finger sleeves 26 are powered by articulated frames that gently apply bending forces to the respective fingers. In both embodiments, the commands applied to the finger sleeves are coordinated with a selected music score provided by a program. It is from these repeated finger sleeve movements that the user's muscle memory is developed. Muscle memory is necessary to strike the proper keys, at the exact proper times, in the proper sequence and rhythm, and using the proper velocity, speed and timing.

Figure 4:
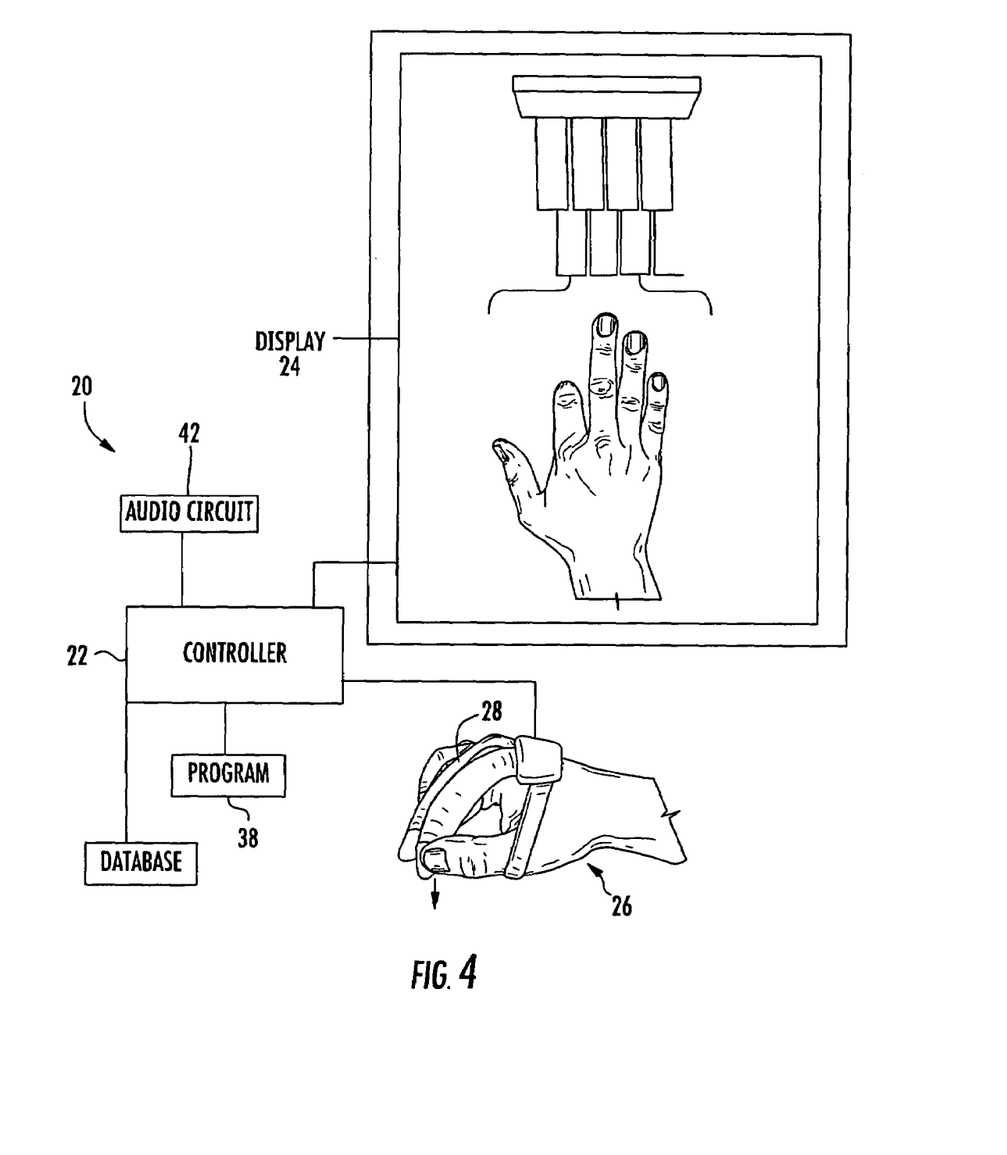
FIG. 4 is schematic representation of the interface system components.

The controller is provided at least one program 38 containing the commands necessary to create a musical score therein. The control means may have a dedicated hard drive programmed to operate the described system or the system may be on a CD with the system program and selected music which may be installed on any standard computer. In addition, the program containing the commands may be stored in a data storage site 40 remotely accessible through the Internet (FIG. 4).

The interface system further includes an audio circuit 42 connected to the controller for providing the proper sound for the segment of music being visually depicted by the display means. The audio circuit of the computer is used to produce the proper sounds depicted visually by the monitor.

The controller and monitor provide the user a simulated two or three-dimensional depiction of at least a portion of a keyboard to show which keys to be played. This provides the player with an interface on which to practice on a virtual keyboard on nearly any computer, thereby, making it portable. The virtual representation may or may not include the player's hands, as desired.

One of the functions of the display means 24 is to provide a visual display of the keyboard depicted as played synchronized with a selected music score, as discussed above. Another function of the display means is to provide a depiction of sheet music or other visual representation of music, with or without hand positions 80 (FIG. 5).

Figure 5:
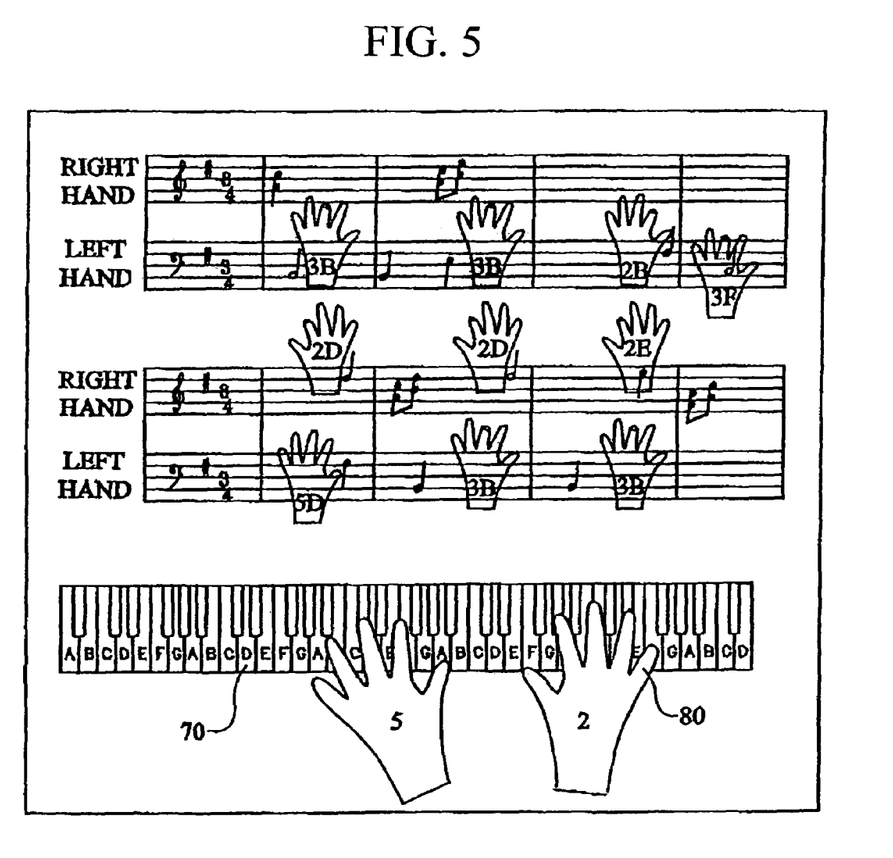
FIG. 5 is a 2-dimensional representation of the keyboard with hand positions.

FIG. 5 depicts a representation of images produced in one mode of the computer programming to illustrate the keyboard designations 70 (i.e., notes) and the hand positions 80 necessary for a particular segment of the music being played or to be played.

In FIG. 6, a simulated three-dimensional depiction of a portion of a keyboard 100 is projected on the monitor to show the key 101 to be played for one exercise of the method.

Figure 7:
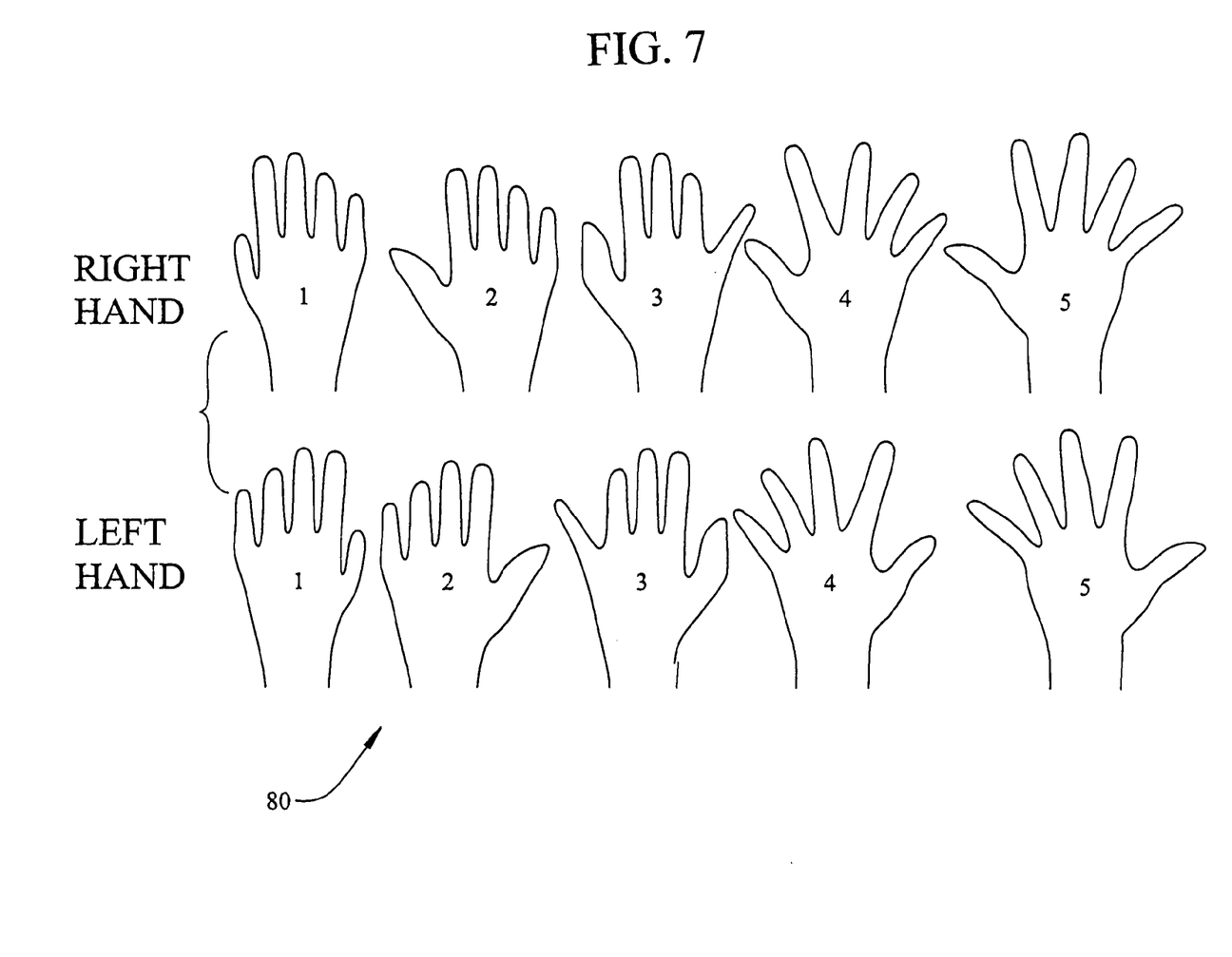
FIG. 7 shows the numbered hand positions.

In FIG. 7, the numbered hand positions 80 used in this method are shown on the monitor. These positions 80 are integrated with the keyboard, as shown in FIG. 5.

In another embodiment of piano teaching interface in accordance with the teachings of the present invention the glove is sensorized and integrally connected with the finger sleeves. The sensor glove is worn on the player's hand and measures the positions of the patient's fingers and wrist flexion, with the finger sleeves of the present invention worn on top, as discussed above. One such sensorized glove well known to those having skill in the art is CYBERGLOVE™ (manufactured by Virtual Technologies, Inc.).

Sensor gloves have a plurality of extremely thin and flexible sensors located at various positions thereon that transform hand and finger motions into real-time digital jointangle data. In this embodiment, the controller 22 includes appropriate software (such as VIRTUALHAND® Suite 2000) that converts the data obtained from the sensor glove into a graphical hand, which directly mimics the movements of the user's physical hand. Additionally, the sensor glove can include the ability to simulate resistance at the surface of the computer-generated piano keyboard.

This embodiment can be used in coordination with any display means, such as a monitor or cybergoggles for an immersive virtual reality experience. Alternatively, the display means could comprise a simulated three-dimensional depiction of the user's hand and at least a portion of the virtual keyboard to show the keys to be played, as discussed above with respect to the previous embodiment.

To use the interface system to learn to play a musical instrument, such as a piano, the following steps are recommended:

1. Attach "finger sleeves" over gloves or over sensor gloves. The finger sleeves are marked to identify left and right hands as well as each finger.

2. Place the fingers of both hands in starting position over the white keys in the center of the virtual keyboard.

3. The finger sleeves will require you to relax your fingers completely and let the conductive line on each finger gently pull the fingers down.

If you feel like any part of your hands, arms, or body is getting tired, take a break and restart practice after some rest. The best way to increase stamina is to practice every day. Stamina must be built gradually with the concert hands.

Practice the song in your mind. Recall the song in sections of numbered hand positions. Most of the time sections will repeat. By learning 10 bars or sections of the song enables you to play 70% of the song. Another practice tip is, while practicing one section, always include the beginning of the next section. Any section may be broken up into shorter sections for practice, but sections must overlap. Practicing short sections allows you to practice the same section dozens, even hundreds of times, in a matter of minutes. Choosing short sections enables you to bring difficult sections up to speed in just minutes.

Singing or humming while you play can aid in the feel and the timing of the song. There will be a certain degree of improvement each time you play. This will vary by each persons ability in adapting to the system and how often they practice.

The best way to become familiar with a new song is to listen to a performance. Memorize the sound and feeling of each section. Then when you play the song yourself, listen and be aware of every sound you produce.

The hand and fingers should form a dome shape in order to curve the fingers so that the finger sleeves can pull the fingers down naturally. After the fingers have been pulled down you will have to lift your finger up to prepare for the next pull. The automatic reflex action of your fingers after pressing a key will do most of it if you relax your finger. Turn off the necessary muscles as soon as their job is finished. Practice relaxing your finger after a note is played. Your hands and fingers will probably have a tendency to be too rigid when you first start using the instant device. This will not allow the finger sleeves to pull the fingers down at the right time or maybe not at all. When changing to different numbered hand positions, stretch and cup the palm of hand more so than the fingers. Try to keep the playing finger in line with the forearm as much as possible.

A large part of your initial memory will be hand and finger memory, which comes from repeated finger sleeve movements. Hand and finger memory develop from reflex hand motion and a reflex from the sound of the piano. After playing the first note, the reflex plays the second note, which stimulates the third note etc. each time you play a song on the piano with the system, you will gradually anticipate every hand and finger movement in the song. After playing the song a number of times, you will be able to play the song without the interface 10 on a real piano keyboard.

The subject will remember the sequence of the keys and hand positions together with the auditory music. Before playing, scan the sheet music and look for repetitions of hand positions. This will enable you to plan ahead of what you are playing so that you can anticipate the hand positions/numbers that are coming next. There are only 5 hand positions used with the concert hands. Most songs will use only 2-3 hand positions.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and drawings/figures.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A piano teaching interface system for playing a virtual keyboard comprising:
   a pair of gloves each having a plurality of finger sleeves adapted to receive the fingers of a user's hands;
   a controller in communication with said finger sleeves to provide control signals to said finger sleeves to cause the fingers of a user's hand to strike a key on said virtual keyboard necessary to play a segment of said musical score, said controller in communication with at least one program containing commands coordinated with said musical score, wherein said control signals are generated by said controller;
   an audio circuit connected to said controller for providing the proper sound for said segment of music being played; and
   a display means in communication with said controller for providing a virtual representation of the user's hands in relation to said virtual keyboard, thereby illustrating the proper positioning of the virtual hands on said virtual keyboard necessary to play said musical score.

2. A piano teaching interface as set forth in claim 1, comprising a frame in said finger sleeves, said frame adapted to move a finger to strike a key.

3. A piano teaching interface as set forth in claim 1, wherein said pair of gloves comprise a pair of sensor gloves including a plurality of flexible sensors located at various positions thereon, and said controller includes software that converts the data obtained from the sensor glove into a graphical hand on said display means which directly mimics the movements of the user's physical hand.

4. A piano teaching interface as set forth in claim 1, wherein said display means includes a monitor.

5. A piano teaching interface as set forth in claim 1, wherein said display means includes stereoscopic goggles.

6. A method of teaching a user to play using a piano teaching interface system for playing a virtual keyboard comprising the steps of:
   (a) providing an interface device comprising a pair of gloves each having a plurality of finger sleeves adapted to receive the fingers of a user's hands, said finger sleeves in communication with a controller, said controller in communication with at least one program containing commands coordinated with a musical score, wherein said control signals are generated by said controller;
   said controller in further communication with an audio circuit for providing the proper sound for said musical score, and a display means for providing a virtual representation of the user's hands in relation to said virtual keyboard, said display means illustrating proper positioning of the virtual hands on said virtual keyboard necessary to play said musical score;
   (b) initiating at least one said computer program which includes said at least one musical score;
   (c) commanding said controller to send signals to said finger sleeves to cause the fingers of a user's hand to strike at least one virtual key on said virtual keyboard necessary to play said musical score.

7. A method of teaching as set forth in claim 6, wherein said pair of gloves comprise a pair of sensor gloves including a plurality of flexible sensors located at various positions thereon, and said controller includes software that converts the data obtained from the sensor glove into a graphical hand on said display means which directly mimics the movements of the user's physical hand.

8. A method of teaching as set forth in claim 6, wherein said display means includes a monitor.

9. A method of teaching as set forth in claim 6, wherein said display means includes stereoscopic goggles.

10. A method of teaching as set forth in claim 6, comprising a frame in said finger sleeves, said frame adapted to move a finger to strike a key.

* * * * *